(12) United States Patent
Skaringer et al.

(10) Patent No.: US 7,003,783 B2
(45) Date of Patent: Feb. 21, 2006

(54) METHOD AND DEVICE FOR PROVIDING DOWNLOADED OBJECTS TO AN APPLICATION

(75) Inventors: Lars Skaringer, Brussels (BE); Olivier Thiery, Brussels (BE)

(73) Assignee: Sony Service Centre (Europe) N.V., Londerzeel (BE)

( * ) Notice: Subject to any disclaimer, the term of this patent is extended or adjusted under 35 U.S.C. 154(b) by 565 days.

(21) Appl. No.: 10/052,860

(22) Filed: Jan. 16, 2002

(65) Prior Publication Data
US 2002/0107995 A1  Aug. 8, 2002

(30) Foreign Application Priority Data
Jan. 18, 2001  (EP) .................................. 01300430

(51) Int. Cl.
*G06F 9/445* (2006.01)

(52) U.S. Cl. .................. 719/332; 717/178; 717/170; 715/749; 348/135; 348/169; 719/315; 707/203

(58) Field of Classification Search ............... 717/170, 717/168, 178; 719/315, 332; 725/132, 140, 725/131, 139, 151, 152, 92, 115, 142; 715/749; 348/135, 169; 707/203
See application file for complete search history.

(56) References Cited

U.S. PATENT DOCUMENTS

| | | | | |
|---|---|---|---|---|
| 4,558,413 A | * | 12/1985 | Schmidt et al. ............. 707/203 |
| 5,619,250 A | * | 4/1997 | McClellan et al. ......... 725/132 |
| 5,635,979 A | * | 6/1997 | Kostreski et al. ........... 725/132 |
| 5,666,293 A | * | 9/1997 | Metz et al. .................. 709/220 |
| 5,764,992 A | * | 6/1998 | Kullick et al. .............. 717/170 |
| 5,787,288 A | * | 7/1998 | Nagata et al. .............. 717/173 |
| 5,864,837 A | * | 1/1999 | Maimone ....................... 707/1 |
| 6,070,012 A | * | 5/2000 | Eitner et al. ................. 717/168 |
| 6,148,081 A | | 11/2000 | Szymanski et al. |
| 6,209,127 B1 | * | 3/2001 | Mori et al. .................. 717/162 |
| 6,209,128 B1 | * | 3/2001 | Gerard et al. ............... 717/108 |
| 6,240,550 B1 | * | 5/2001 | Nathan et al. .............. 717/169 |
| 6,405,239 B1 | * | 6/2002 | Addington et al. ......... 709/203 |
| 6,467,088 B1 | * | 10/2002 | alSafadi et al. ............. 717/173 |
| 6,622,004 B1 | * | 9/2003 | Sonoda et al. ............. 455/3.05 |

(Continued)

FOREIGN PATENT DOCUMENTS

WO    WO 99 65230    12/1999

OTHER PUBLICATIONS

Crinon, Regis J. "The DSM-CC Object Carousel for Broadcast Data Services." IEEE. 1997.*

(Continued)

*Primary Examiner*—Lewis A. Bullock, Jr.
(74) *Attorney, Agent, or Firm*—Frommer Lawrence & Haug LLP; William S. Frommer; Samuel S. Lee

(57) ABSTRACT

A method and device for providing downloaded objects to an application including downloading from a received transport stream a module containing an object requested by an application, storing the downloaded module, monitoring whether the stored module is the current version, when the application requests an object of a stored module and the stored module is a current version, providing the application with the object from the stored module, and when the application requests an object of a stored module and the stored module is not a current version, copying only the objects of the stored module still in use by the application, downloading the current version of the stored module and overwriting the stored module with the downloaded current version of the stored module.

9 Claims, 4 Drawing Sheets

U.S. PATENT DOCUMENTS

| | | | |
|---|---|---|---|
| 6,628,314 B1 * | 9/2003 | Hoyle | 715/854 |
| 6,629,227 B1 * | 9/2003 | Jerding et al. | 711/170 |
| 6,704,933 B1 * | 3/2004 | Tanaka et al. | 725/132 |
| 6,708,338 B1 * | 3/2004 | Kim | 725/135 |
| 6,711,737 B1 * | 3/2004 | Okamura | 717/173 |
| 6,813,778 B1 * | 11/2004 | Poli et al. | 725/132 |
| 6,871,002 B1 * | 3/2005 | Saito | 386/46 |

OTHER PUBLICATIONS

The Delphion Integrated View: INPADOC Record. CN1272667A: Multibit Magnetic Surface Digital Storage Method; Nov. 8, 2000/Apr. 29, 1999.

Meyer-Boudnik T et al: "MHEG Explained" IEEE Multimedia, IEEE Computer Society, US, vol. 2, NR. 1, pp. 26-38, XP000500084.

Evain J-P: "The Multimedia Home Platform", EBU Review-Technical, BE, European Broadcasting Union. Brussels, NR. 275, pp. 4-10, XP000767493.

Ladebusch U: "Einfuehrung in Den DVB-Datenrundfunk" Fernseh Und Kinotechnik, VDE Verlag GmbH. Berlin, DE, vol. 52, NR. 7, pp. 425-432, XP000870644.

\* cited by examiner

METHOD AND DEVICE FOR PROVIDING DOWNLOADED OBJECTS TO AN APPLICATION

BACKGROUND OF THE INVENTION

1. Field of the Invention

The present invention relates to a method and device for providing downloaded objects to an application, in particular to downloading information from a transport stream so as to provide on request data objects to an application.

2. Description of the Related Art

It is known to transmit data objects in a transport stream for downloading by an end user. The objects can include any form of data for use by the end user and can be transmitted in a distributed repetitive form, for instance by means of a data carousel. Often, data objects may be grouped together as data modules such that, for an application of an end user to make use of a particular object, the entire module in which it is contained has to be downloaded from the transport stream. In these circumstances, service providers may group together related objects in respective modules such that, if an end user stores a downloaded module, the access time for the related objects is greatly reduced.

According to the DSM-CC broadcast protocol, objects, such as files, directories, etc, are conveyed to the receivers of end users in the form of BIOP messages carried inside DSM-CC modules. These modules may be broadcast by means of a carousel, each module being reformatted into a plurality of MPEG sections which are broadcast in a distributed form for end users to receive and recombine into the respective modules.

Over time, it is likely that objects will be updated by the service providers. Under these circumstances, it is desirable that, when an application of an end user requests an object, it should receive the latest version of that object. However, if, before the object was updated, the end user had already downloaded the respective module, the application will be provided with the old version of the object as contained in the modules stored by the end user.

OBJECTS AND SUMMARY OF THE INVENTION

It is an object of the present invention to overcome this problem.

According to the present invention, there is provided a method of providing downloaded objects to an application, the method including downloading from a received transport stream a module containing an object requested by an application, storing the downloaded module, monitoring whether the module in the module memory is a current version, when the application requests an object of a stored module and the stored module is a current version, providing the application with the object from the stored module and, when the application requests an object of a stored module and the stored module is not a current version, copying only the objects of the stored module still in use by the application, downloading the current version of the stored module and overwriting the stored module with the downloaded current version of the stored module.

According to the present invention, there is also provided a device for providing downloaded objects to an application, the device including an object layer interface for downloading from a received transport stream a module containing an object requested by an application, a module memory for storing downloaded modules and a controller for monitoring whether the modules in the memory are current versions, wherein, when the application requests an object contained in a stored module and the stored module is a current version, the object layer interface provides the application with the object from the module memory and, when the application requests an object contained in a stored module and the stored module is not a current version, the object layer interface downloads the current version of the module and overwrites the module stored in the module memory; the device further including an object cache for storing objects, wherein, when the application requests an object contained in a stored module and the stored module is not the current version, before the object layer interface overwrites the stored module with the current version of the stored module, the controller copies into the object cache only the objects of the stored module still in use by the application.

In this way, when an application requests an object, it is always provided with the latest version of that object. However, the application is still able to continue using any objects in the same module which it had previously requested.

As an alternative to the above, when an application requests an object contained in a stored module which is not the current version but which contains other objects already in use by the application, the device could merely download and store the new current version of the module and store it in addition to the previous version of the module. In this way, the application would have access to the current version of the newly requested object whilst maintaining interaction with the previously requested objects. However, this approach is extremely wasteful of memory, particularly where modules contain a large number of objects and an application might be using only one object from a stored module.

Similarly, it is possible for a device to include only an object memory in place of the module memory such that it only stores the objects being used by the application. In this way, whenever a new object is requested by the application, the end user always downloads that object from the transport stream and, hence, always obtains the current version. However, this approach severely limits access speeds when related objects are contained together in respective modules and, hence, requested objects can often be retrieved from a previously stored module.

Thus, the present invention allows applications to be provided with objects with optimum access times, but with minimum memory requirements.

Since the requests of an application are handled in this way, the application itself need not know the origin of the objects which it uses. The transparent caching of the objects may be achieved by an object layer implemented in hardware or software.

Preferably, the controller is responsive to information in the transport stream regarding the current versions of modules transmitted in the transport stream.

In many systems, such as broadcast from DSM-CC carousels, information is sent in the transport stream regarding the updating of modules on the carousel. The controller can monitor this information such that when the application requests an object from an updated module, the controller can take the steps defined above.

Preferably, the controller monitors whether modules are the current version according to the specifications for MHP platforms.

Thus, in the context of broadcasts according to the MHP specifications, transparent caching of objects may be provided such that applications are always provided with the most up to date objects.

Preferably, the objects are DSM-CC objects and the modules are DSM-CC modules.

Hence, the present invention may be used in conjunction with DSM-CC systems.

Preferably, the objects are copied from the module memory to the object cache by copying the corresponding BIOP messages.

Since DSM-CC objects are contained within DSM-CC modules as BIOP messages, the object cache can store the objects in their BIOP message form.

Preferably, at least one filter is provided for filtering out the transport stream packets of a module to be downloaded.

This may be achieved by filtering out the sections of a module to be downloaded, for instance MPEG-2 sections. Hence, packets, such as MPEG packets, in the transport stream are checked to determine whether or not they relate to a module to be downloaded. All of the relevant packets are copied from the transport stream by the section filter such that they may be re-assembled to form the module.

Preferably, the device is a television device. Hence, the invention may be embodied in television devices, such as integrated televisions and set top boxes, for receiving additional television services.

Preferably, the device is MHP compliant.

It will be appreciated that the invention can be implemented in software and recorded on a storage medium. Indeed, a device already configured to download modules for requested objects could be supplemented by an appropriate object layer such that, in accordance with the present invention, when the application requests an object of a stored module and the stored module is not a current version, objects of the stored modules still in use by the application are copied. The object layer provides the transparent caching such that the application may continue to use the copied objects without any knowledge of the copying or changes in memory addressing.

DETAILED DESCRIPTION OF THE PREFERRED EMBODIMENTS

The invention will be more clearly understood from the following description, given by way of example only, with reference to the accompanying drawings.

The present invention will be described with reference to an embodiment for use according to the DSM-CC broadcast protocol. However, it will be appreciated that it is applicable to any system in which objects for use with end user applications are transmitted together in modules.

According to the DSM-CC broadcast protocol, objects, such as files and directories, are conveyed to end user receivers in the form of BIOP messages, themselves carried inside Data Carousel modules. One such module can and usually does contain several BIOP messages. In this regard, service providers usually group together related BIOP messages in the same module.

Thus, as a consequence of this nature of DSM-CC object carousels, DSM-CC client stacks, i.e. the software layer stack implemented in the receiver to handle downloaded data, are often implemented as "module based". In other words, data downloaded from a received transport stream is kept at a module level, i.e. in the form of the received modules, rather than as original objects or BIOP messages.

By storing the received data at module level in the form of the modules as received, it is possible to improve on the access speed achievable by the end user device. In particular, since related objects are normally grouped together in the same module, it is advantageous to keep the entire module in memory. This is because a user application which has requested one object from a module is likely to request other objects from the same module. If that module is kept in memory, clearly, the application can access it more quickly than if it has to be retrieved from the transport stream.

Figure 1:
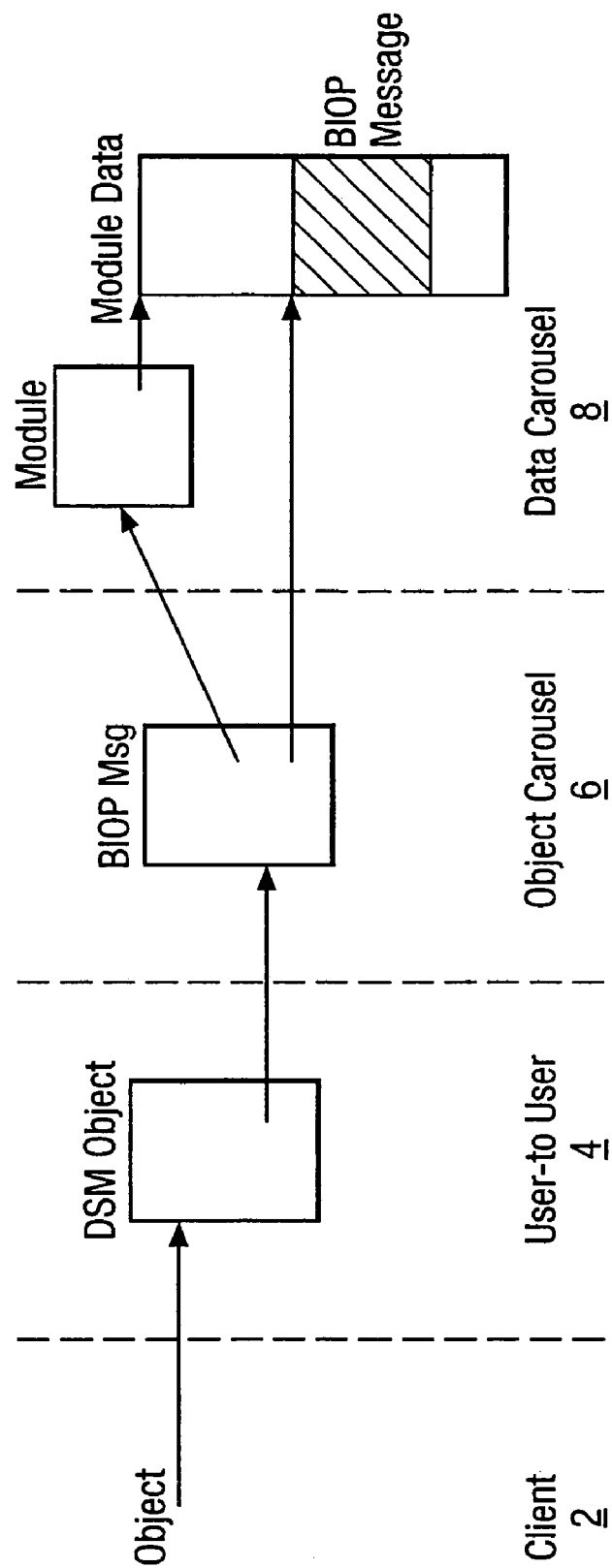
FIG. 1 illustrates a module based DSM-CC client stack.

FIG. 1 illustrates a module based DSM-CC client stack for operation as described above.

As client layer 2, in which an end user application may be running, is able to request DSM-CC objects by means of opaque references, such as index number, data address, etc.

The user to user layer 4 then provides a high level representation of any BIOP messages. This layer implements any operations which the client application can invoke, such as read file, list directory, etc. It interfaces with the object carousel layer so as to request BIOP messages to be loaded (or unloaded) according to the requests for objects made by the application in the client layer.

The object carousel layer 6 maintains any BIOP messages and provides basic BIOP message access routines to the user to user layer 4. In order to obtain appropriate BIOP messages according to the needs of the application in the client layer 2, the object carousel layer 6 interfaces with the data carousel layer 8 in order to request the loading or closing of data carousel modules.

The data carousel layer 8 is the lowest layer of the client stack and is responsible for assembling the data carousel modules. Thus, when a particular module is required in order to provide a requested object to the application in the client layer 2, the data carousel 8 sets up appropriate section filters to extract MPEG-2 sections carrying the DSM-CC messages relevant to the required module. It is also possible for the data carousel layer 8 to remove filters when they are no longer required.

The approach of storing an entire module when that module is downloaded from the transport stream to provide a particular object to an application could be described as "module-based caching". This approach gives rise to problems when dealing with dynamic content, i.e. objects whose contents change over time. In particular, where an object is requested by an application and that object is contained in a module which is already available in cache on the device, if the content of the object is subject to change, there is no guarantee that the object in cache is the current version.

It is clearly desirable that an application always receives the latest version of an object. Indeed, according to the MHP specification, the DSM-CC stack must return the object which corresponds to the latest available version on the transport stream. This behaviour is known as "transparent caching". In order to implement transparent caching, it would seem that a module which is already stored in cache may at any given point in time need to be reloaded from the broadcast transport stream. The problem arises that where a reference already exists to that module, for instance the application in the client layer 2 is using at least one of the objects from that module, these references must still remain valid. Thus, if an application in the client layer 2 is using one or more objects from the module, the application must be able to continue to use the data of those objects without change. In particular, if an application is already running on the basis of the data contained in a particular object, that data cannot be allowed to change mid way through the operations being conducted by the application. Thus, it would seem that the old version of a module needs to be kept when a new version is loaded from the broadcast stream.

By letting the data carousel layer 8 maintain several versions of the same module, a considerable loss in memory efficiency occurs, since outdated object data which is not being used has to be kept in memory unnecessarily. Furthermore, with this arrangement, the complexity of the lower layers of the client stack (data carousel client implementation) would require increased complexity.

As an alternative, the DSM-CC client could be implemented in a manner which is object based. In other words, rather than caching loaded modules, only the objects requested by the application in the client layer 2 would be cached. This could be described as an object-based caching approach. This will easily cater for the transparent caching discussed above. However, since all new references to objects will require downloading of modules from the broadcast stream, operation of the application in the client layer 2 will be much slower.

Figure 2:
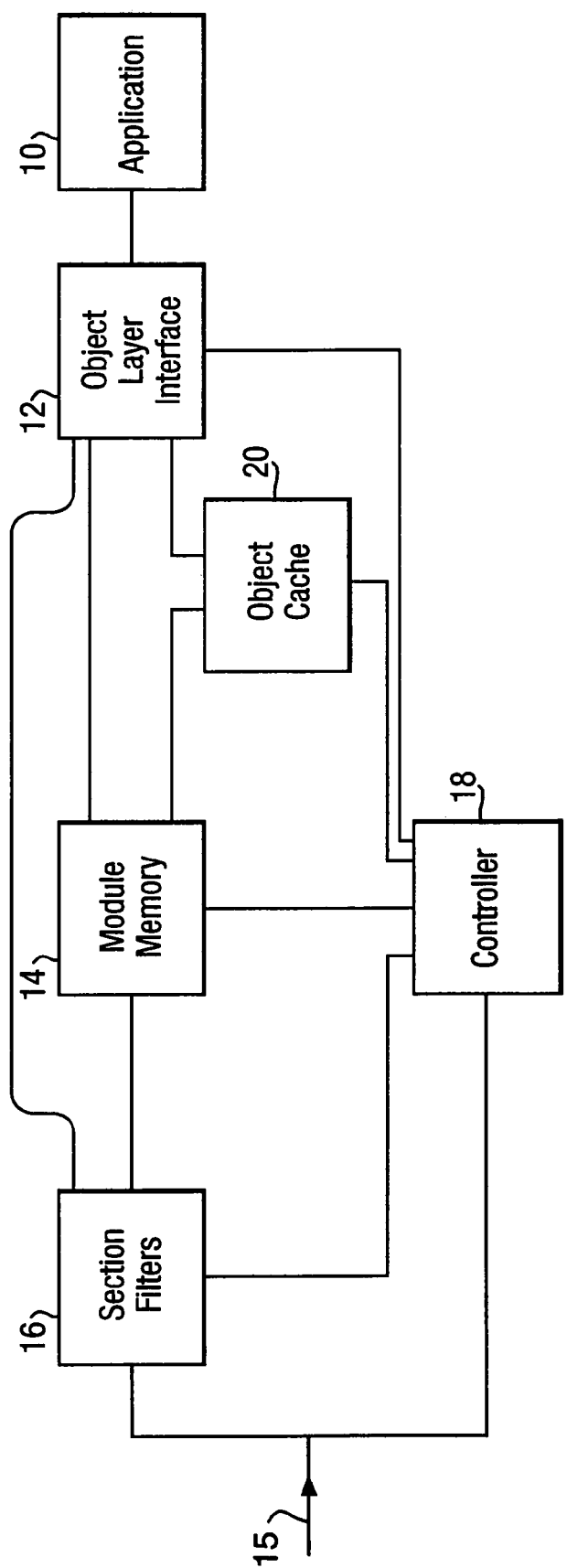
FIG. 2 illustrates schematically a device embodying the present invention.

FIG. 2 illustrates schematically a device allowing these problems to be overcome. Of course, in practice, this device is likely to be implemented in software having the form of the client stack described with reference to FIG. 1.

As will be discussed below, the DSM-CC client is implemented as a hybrid between the two caching approaches discussed above. In particular, whenever a module is discovered to be an old version, in other words out of date, the DSM-CC stack copies only the data which needs to be kept, i.e. the referenced objects or more likely in practice BIOP messages, and then releases the module.

According to the request of an application 10 for a particular object, an object layer interface 12 searches a module memory 14 for the corresponding module containing the BIOP message for the requested object. In practice, a register may be kept of the previously downloaded modules being stored.

If the appropriate module is not already stored in the module memory 14, then steps are taken to download the required data from a received broadcast transport stream 15. In particular, one or more section filters 16 may be used to extract from the stream 15 sections required to reconstruct the desired module. For instance MPEG section filters may be used to extract MPEG-2 sections carrying the required DSM-CC module.

When the desired module is received, the originally requested object contained in that module is provided by the object layer interface 12 to the application 10. The entire module is also stored in the module memory 14.

A controller 18 is also provided. It will be appreciated that this is a schematic representation of a function which may be contained within the overall operation of the device.

The controller 18 is sensitive to data in the broadcast transport stream 15 and determines when modules available over the stream 15 have been updated. In this way, the controller 18 may determine whether or not modules stored in the module memory 14 are current or old versions. As illustrated, the controller 18 derives this version information directly from the broadcast transport stream 15. However, as mentioned above, this representation is schematic and, in practice, this information may be derived by means of an appropriate section filter.

As will be discussed below in further detail, when the controller determines that a module stored in the module memory 14 is now available in a new version, it can initiate downloading of that new version from the broadcast transport stream 15. This downloading can be initiated as soon as the new version is detected or only once the object layer interface 12 attempts to access an object contained in that module.

Where the application 10 is already using one or more objects contained in the module to be updated, the controller 18 first copies the objects or corresponding BIOP messages to an object cache 20. The object layer interface 12 is informed of this copying such that the application 10 may continue to use the data of the objects without knowledge of the transfer of data. In other words, the object layer interface can handle any re-addressing required such that the application 10 retrieves data from the object cache 20 rather than the module memory 14.

In this way, any objects currently in use are maintained in the object cache, but modules are updated with their new current versions such that new references to any objects contained in those modules are always references to the latest version of the object.

As mentioned above, the controller can update the module memory as soon as a new version of a module appears or, alternatively, can update the module only when the application 10 attempts to make reference to an object within that module. A module might be updated as soon as a new version is available on the basis that the application 10 is already referring to at least one object in that module and, hence, is likely to wish to refer to other objects of that module in the future. By updating the module as soon as the new version is available, future access times are likely to be reduced. On the other hand, updating the module whenever the new version appears may be considered to be unnecessary processing in some environments, since the application 10 may not require reference to any further objects of that module.

Thus, if a module is being updated, objects which are still open will be cached at an object level rather than at a module level. Only the latest available version of a module will be kept in the system memory at a given time. This means that only important, i.e. potentially useful, data is ever kept in cache by the DSM-CC stack. In this way, the mechanism combines the speed of a module-based cache with the memory efficiency of an object-based cache. The client layer 2 and any application 10 in the client layer 2 never directly accesses the object data, since the copying of the object or BIOP message into the object cache 20 will change the object data location in memory. The object carousel layer 6 as represented by the object layer interface 12 provides the layer of insulation that guarantees this behaviour.

Figure 3:
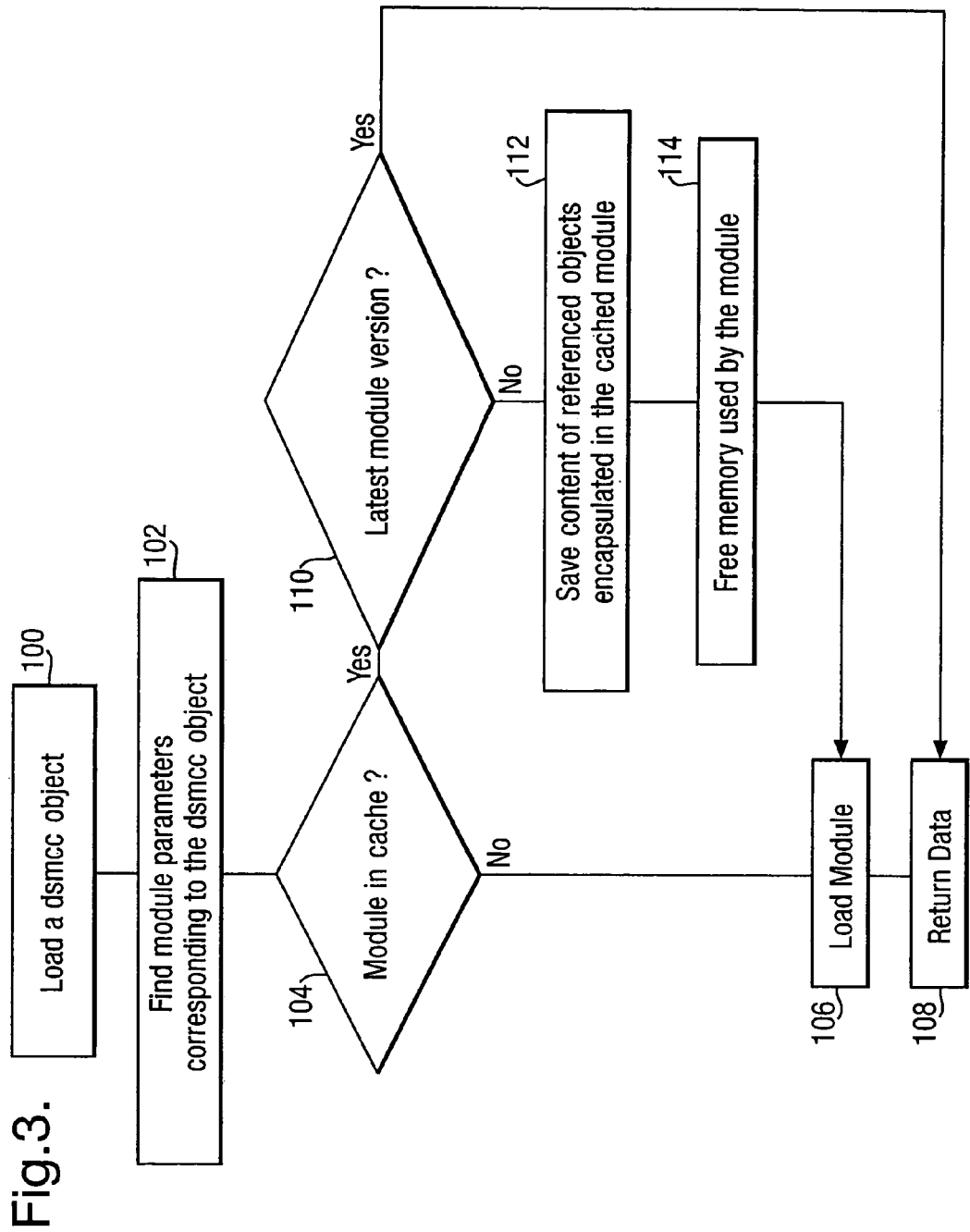
FIG. 3 illustrates a flow chart for a process embodying the present invention.
Figure 4A:
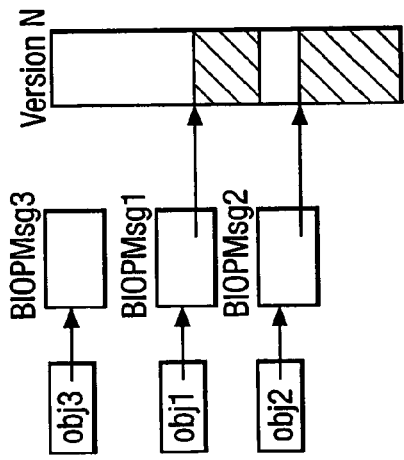
FIGS. 4(a), (b), (c) and (d) illustrate an update scenario.
Figure 4B:
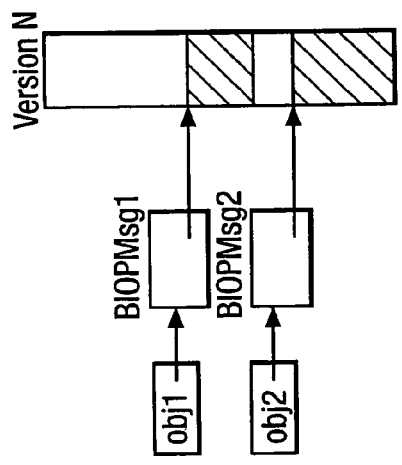
Figure 4C:
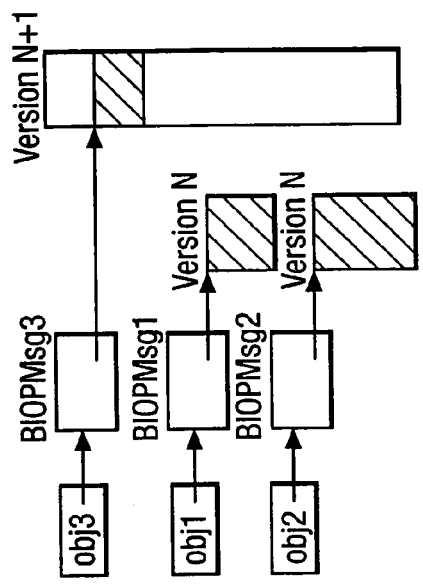
Figure 4D:
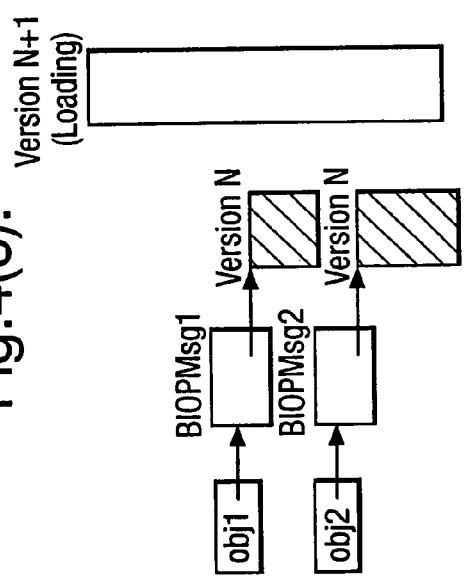

The process is illustrated in the flow diagram of FIG. 3.

In step 100, a request is made to load a DSM-CC object. As a result of this, the module parameters are found for the module corresponding to the requested DSM-CC object in step 102. Thus, the system can maintain an appropriate database of parameters so as to determine the required module.

In step 104, it is determined whether the module is in cache, for instance whether it is stored in the module memory 14.

If the module has not been previously downloaded and, hence, has not been stored, then the process proceeds to step 106 in which the module is loaded and stored in cache. Then, in step 108 the required data for the requested DSM-CC object is returned to the application.

If, in step 104, it is determined that the required module is not in cache, then the process proceeds to step 110. At this step, it is determined whether or not the desired module in cache is the latest version of that module. If it is, the process may proceed to step 108 and return the object data to the application.

If step 110 determines that the module in cache is not the latest version, then the process proceeds to step 112. In this step, any referenced objects, i.e. objects already referenced by the application, which are contained within the cached module are then saved, for instance by copying them to the object cache 20.

In step 114, the memory used by the module is then freed such that the process may proceed to step 106 to load the required module.

It should be appreciated that, as mentioned above, rather than awaiting a request for the object of a module, the process can alternatively conduct steps 110, 112, 114 and 106 continuously so as to ensure that the latest version of the downloaded module is always available.

A particular scenario will now be described with reference to FIGS. 4(*a*) to (*d*).

In this scenario, an application has open references to two objects which are conveyed in the same module. The objects are both of version N. The version currently available on the stream is N+1. However, at the time, the application is not aware of this.

In FIG. 4(*a*), it is illustrated that the application references object 1 and object 2 by means of BIOP message 1 and BIOP message 2 of version N of the required module.

In FIG. 4(*b*), the application requests object 3. At this time, the data carousel layer checks the version available on the stream and discovers version N30 1.

As illustrated in FIG. 4(*c*), the data carousel layer notifies the object carousel layer that a new version of the module is available on the stream. The object carousel layer therefore copies all BIOP messages which it references from the module and closes all accesses to it.

The new version of the module can now safely be loaded and, as illustrated in FIG. 4(*d*), with loading completed, object 3 now accesses the latest version with object 1 and object 2 still accessing the previous version.

We claim:

1. A television system for providing downloaded objects to an application, the device including:

an object layer interface for downloading from a received transport stream a module containing at least one object requested by an application;

a module memory for storing downloaded module;

a controller for monitoring whether the module in the module memory is a current version; wherein when the application requests an object contained in a stored module and the stored module is a current version, the object layer interface provides the application with the object from the module memory and, when the application requests an object contained in a stored module and the stored module is not a current version, the object layer interface downloads the current version of the module and overwrites the module stored in the module memory; and an object cache for storing objects, wherein when the application requests an object contained in a stored module and the stored module is not the current version, the controller copies into the object cache only the objects of the stored module still in use by the application before the object layer interface overwrites the stored module with the current version of the stored module.

2. A television system according to claim 1 wherein the controller is responsive to information in the transport stream regarding the current versions of the modules transmitted in the transport stream.

3. A television system according to claim 1 wherein the controller monitors whether modules are the current version according to the specifications for MHP platforms.

4. A device according to claim 1 wherein the objects are DSM-CC objects and the modules are DSM-CC modules.

5. A television system according to claim 4 wherein the objects are copied from the module memory to the object cache by copying the corresponding BIOP messages.

6. A television system according to claim 1 further including at least one filter for filtering from the transport stream packets of a module to be downloaded.

7. A television system according to claim 1 wherein the device is a MHP compliant.

8. A computer method of providing downloaded objects to an application, the method including:

downloading from a received transport stream a module containing one object including an object requested by an application;

storing the downloaded module;

monitoring whether the stored module is the current version;

providing the application with the object from a stored module when the application requests an object of a stored module and the stored module is a current version; and copying only the objects of the stored module still in use by the application, downloading the current version of the stored module and overwriting the stored module with the downloaded current version of the stored module when the application requests an object of a stored module and the stored module is not a current version.

9. A computer program, stored in a tangible storage medium for providing downloaded objects to an application, the program comprising executable instructions that cause a computer to:

download from a received transport stream a module containing at least one object including an object requested by an application;

store the downloaded module;

monitor whether the stored module is the current version;

provide the application with the object from a stored module when the application requests an object of a stored module and the stored module is a current version; and copy only the objects of the stored module still in use by the application, download the current version of the stored module and overwrite the stored module with the downloaded current version of the stored module when the application requests an object of a stored module and the stored module is not a current version.

* * * * *